United States Patent
Low et al.

(10) Patent No.: US 10,069,827 B2
(45) Date of Patent: Sep. 4, 2018

(54) EXTENDING AUTHENTICATION AND AUTHORIZATION CAPABILITIES OF AN APPLICATION WITHOUT CODE CHANGES

(71) Applicant: International Business Machines Corporation, Armonk, NY (US)

(72) Inventors: Chee M. Low, Singapore (SG); Sriram Saroop, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 1467 days.

(21) Appl. No.: 13/665,110

(22) Filed: Oct. 31, 2012

(65) Prior Publication Data

US 2014/0123231 A1     May 1, 2014

(51) Int. Cl.
    *H04L 29/06*     (2006.01)

(52) U.S. Cl.
    CPC ...... *H04L 63/0884* (2013.01); *H04L 63/0892* (2013.01); *H04L 63/0272* (2013.01)

(58) Field of Classification Search
    CPC ........................ H04L 63/0884; H04L 63/0892
    See application file for complete search history.

(56) References Cited

U.S. PATENT DOCUMENTS

| | | | |
|---|---|---|---|
| 6,751,729 B1 | 6/2004 | Giniger et al. | |
| 6,895,434 B1 * | 5/2005 | Chandrupatla et al. | 709/223 |
| 7,110,375 B2 | 9/2006 | Khalil et al. | |
| 7,778,199 B2 | 8/2010 | Booth, III et al. | |
| 8,266,269 B2 * | 9/2012 | Short et al. | 709/223 |
| 8,584,224 B1 * | 11/2013 | Pei et al. | 726/10 |
| 2007/0203999 A1 * | 8/2007 | Townsley et al. | 709/207 |
| 2008/0222696 A1 * | 9/2008 | Nicodemus et al. | 726/1 |
| 2010/0005290 A1 * | 1/2010 | Urien et al. | 713/155 |
| 2010/0242092 A1 | 9/2010 | Harris et al. | |
| 2010/0242106 A1 * | 9/2010 | Harris et al. | 726/15 |
| 2012/0023558 A1 * | 1/2012 | Rafiq | 726/6 |

* cited by examiner

*Primary Examiner* — Azizul Choudhury
(74) *Attorney, Agent, or Firm* — Jeffrey S. LaBaw; David H. Judson

(57) ABSTRACT

A generic approach to extending the authentication and authorization capabilities of a client-server application (e.g., a VPN) without any code changes. To this end, the application is augmented with an authentication mechanism comprising a pair of cooperating components: an authentication agent that is associated with (and hooks into) the client-side of the application, and an authentication server that is associated with the server-side. In operation, the authentication server issues commands to the authentication agent to acquire all required data from the user, device or host environment, and the authentication agent (hooked into the VPN client) scrapes requests originating from the authentication server and injects (e.g., by auto-fill) the appropriate responses into the VPN client UI for transmission back through the VPN server and to the authentication server. The commands and responses are communicated using a challenge-response protocol (e.g., RADIUS) implemented by the VPN client-server.

24 Claims, 6 Drawing Sheets

EXTENDING AUTHENTICATION AND AUTHORIZATION CAPABILITIES OF AN APPLICATION WITHOUT CODE CHANGES

BACKGROUND OF THE INVENTION

Technical Field

This disclosure relates generally to a generic approach to extending and enriching the authentication and authorization capabilities of software applications without any change to the applications themselves.

Background of the Related Art

Currently, enterprises deploy a combination of various forms of network/resource access solutions, such as VPN (virtual private network), VDI (virtual desktop infrastructure), SBC (server-based computing), Web Access Gateways (e.g. IBM® Tivoli® WebSEAL® Access Manager), and wireless LAN gateways. Most of these "access" applications require the user to authenticate at a client side of the application (using an application client), after which the authentication data is forwarded to an authentication server (e.g., based on LDAP or RADIUS) for verification. This way, there is need for an individual application to manage user credentials or to maintain its own user database. In this approach, the user just enters a username/password pair to the application client, which then forwards the data to the application server, which in turn forwards it to an authentication server for verification. This approach works well for password and OTP (one-time password) logons where the application client just need a relatively simple user interface (UI) to acquire the password/OTP from the user, while the application server simply forwards the password/OTP along to the authentication server for verification. In addition, and by modifying the application client and server codes accordingly, some VPN and related applications also have support for smartcard (PKI-based) authentication. Such support has been made possible because smartcard PKI has well-established standards and built-in support from many operating systems.

Many new and innovative forms of authentication technologies have emerged over the recent years. Nevertheless, it has become increasingly difficult for application product vendors to keep up with such innovations. In particular, there is no obvious approach and no dominant standards for an application vendor to follow to integrate with arbitrary authentication products. Many of these authentication products/technologies have a "client" component (an authentication agent or "Auth Agent") and a "server" component (an authentication server or "Auth Server"). The Auth Agent is responsible for interacting with authentication tokens/devices (e.g., fingerprint readers), for interacting with users (e.g., to guide user on how to scan his or her eyes), for gathering additional attributes from the machine (e.g. IP address, geo-location, and the like), and for passing along the collected data to the Auth Server for verification. These technologies also often take advantage of existing mechanisms in the RADIUS protocol (called "EAP") for the application server to pass along to the Auth Server authentication data collected from the client side; that said, there is no standard mechanism for the Auth Agent to pass the information to the application client. In particular, there is no known solution for the Auth Agent and Auth Server to communicate arbitrary information or data through the application client and server. As such, VPNs and similar access applications have not supported new forms of authentication in recent years It is known to deploy some authentication solutions (e.g., an enterprise single sign-on (SSO) solution) that perform two-factor authentication (e.g., with biometrics) of a user upon logon to his/her machine, but where subsequent logon to applications involves just a single password. This approach leaves the applications still protected by just a single factor. Just as importantly, in these approaches the authentication server typically is still hidden behind a VPN, so even when it is used the Auth Agent has no access to the server until the VPN connection is enabled. This means that the Auth Agent needs to be able to authenticate the user using data that is cached at the client machine. If no data is cached, however, the Auth Agent will not be able to authenticate the user. Moreover, if the data cached is stale, the Auth Agent may let the user through inappropriately. More importantly, performing authentication in such an off-line manner precludes the authentication product from making use of up-to-date and much richer information that may be available at the Auth Server (e.g. whether user has been locked out or revoked, whether this current access is consistent with user's past access patterns, and the like).

A related issue is authorization. Many enterprises are now seeking solutions where authorization policies can be managed centrally, and where authorization decisions can be based on a wide variety of information about the user and the machine/network he or she is using (e.g., is the Windows OS patched, does it have an anti-virus program, or the like). Existing client-server based authentication products/technologies do not address the additional requirements that arise with respect to authorization.

BRIEF SUMMARY

This disclosure relates to a generic approach to extending and enriching the authentication and authorization capabilities of a client-server access application (e.g., a VPN) without any change to the application itself. To this end, the client-server access application is augmented with an authentication mechanism comprising a pair of cooperating components: an authentication agent (Auth Agent) that is associated with (and hooks into) the client-side of the client-server access application, and an authentication server (Auth Server) that is associated with the server-side of the client-server access application. In this approach, and taking the example of a VPN, the authentication agent handles all of the client-side interaction with the user, device or host environment so that the user does not interact with the VPN client itself during authentication. On the server side, the authentication server includes all of the necessary logic to perform the desired authentication (authn) and/or authorization (authz). In operation, the authentication server issues commands to the authentication agent to acquire all required data from the user, device or host environment, and the authentication agent (which is hooked into the VPN client) scrapes requests originating from the authentication server and injects (e.g., by auto-fill) the appropriate responses into the VPN client UI for transmission back through the VPN server and to the authentication server, where they are acted upon. Thus, preferably the communications (between the authentication server and authentication agent) leverage an existing challenge-response protocol support (e.g., via RADIUS) that is present in the VPN client-server and that is already used to tunnel requests/responses between the various endpoints of the VPN itself.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
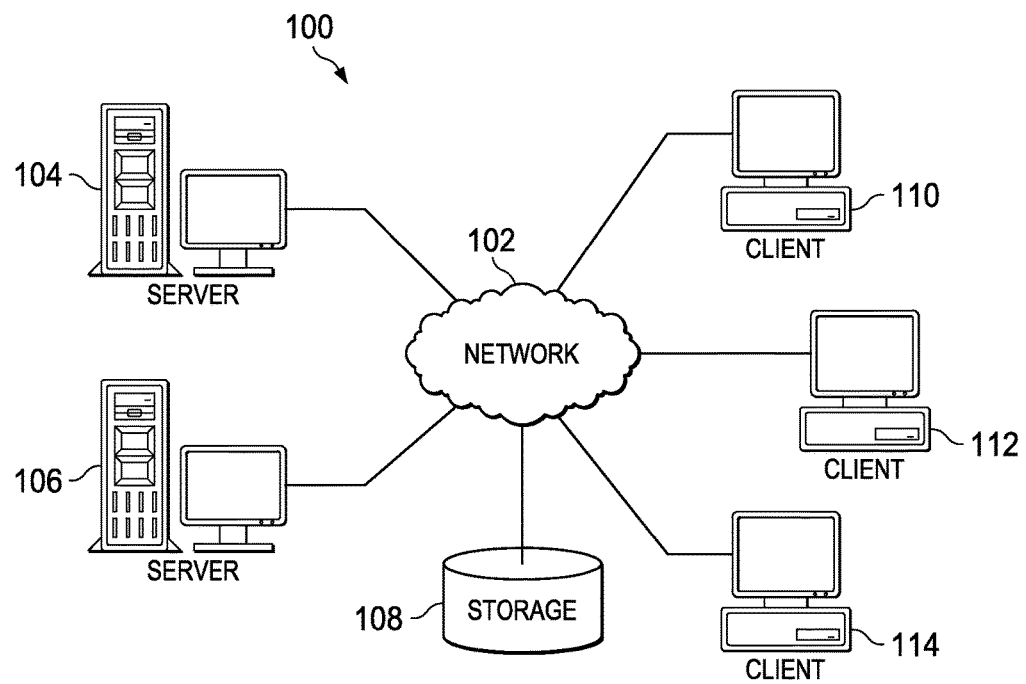
FIG. 1 depicts an exemplary block diagram of a distributed data processing environment in which exemplary aspects of the illustrative embodiments may be implemented.
Figure 2:
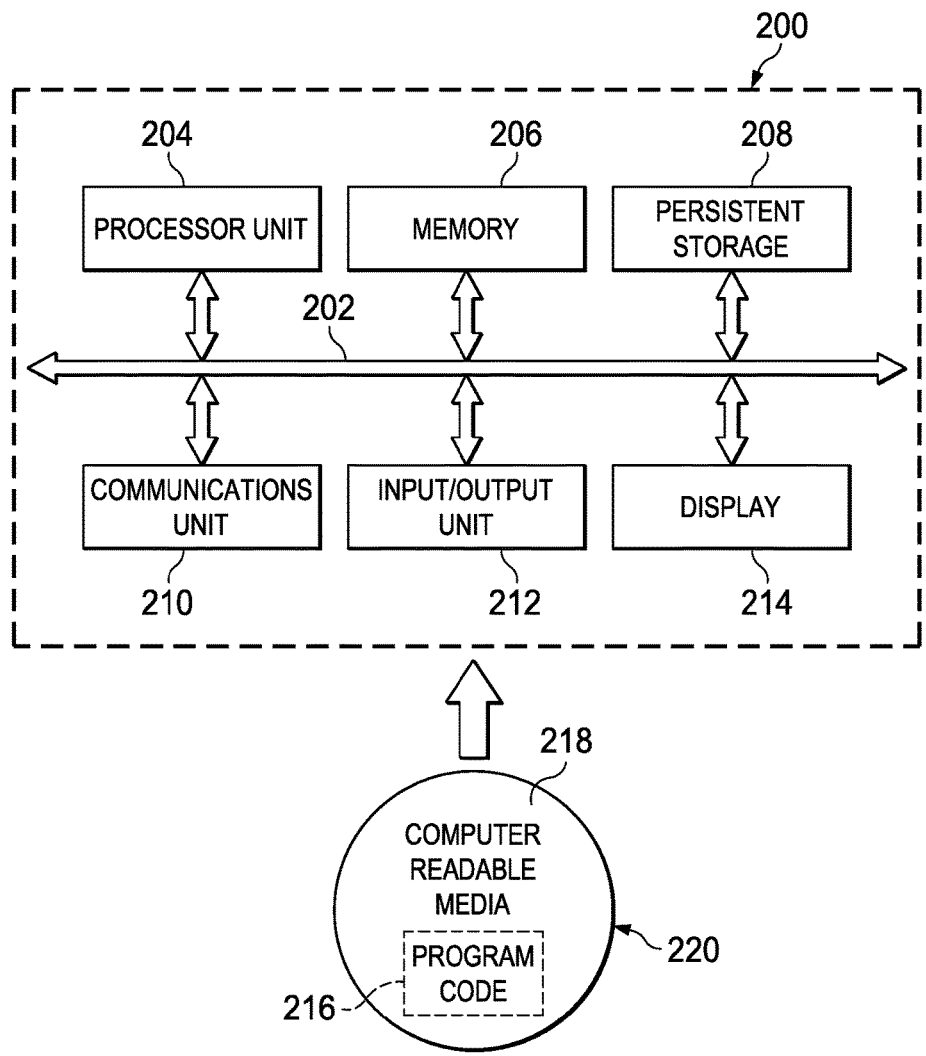
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
The Client-Server Model With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. In such an approach, end users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
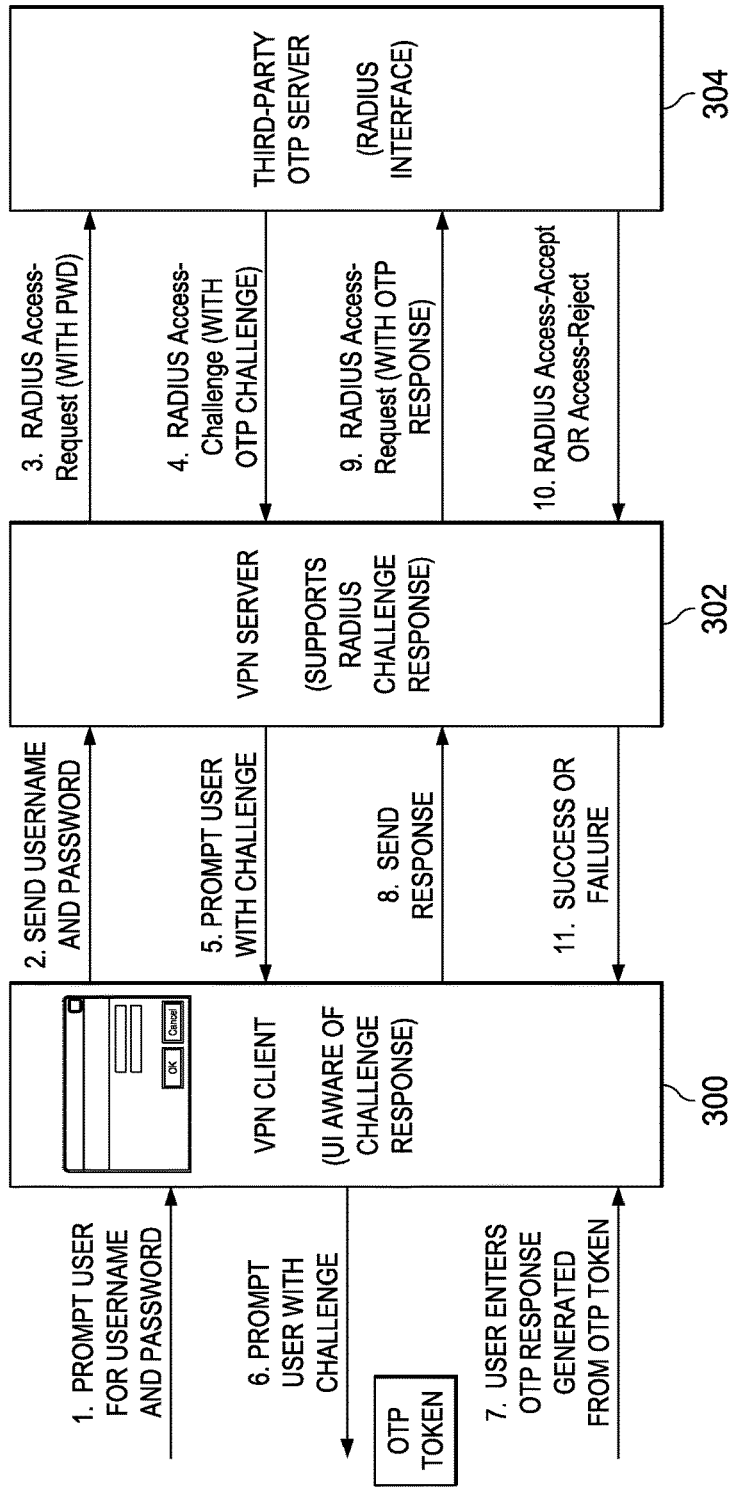
FIG. 3 illustrates how a known virtual private network (VPN)-based authentication scheme may be implemented to support one-time password (OTP)-based challenge-response authentication.

FIG. 3 illustrates an existing authentication mechanism that implements two (2) factor authentication (2FA) over a RADIUS-based challenge-response. As illustrated, in this scenario, there is an application client 300, an application server 302, and an authentication server 304. Typically, the application client 300 is an application (e.g., a VPN client, a VDI client, a Web browser, or the like) that interacts with an end user and provides a service. In this example, the application client is a VPN client supporting an authentication method and the RADIUS challenge-response protocol. The application server 302 is a back-end server (e.g., a VPN server, a VDI server, a network access server (NAS), or the like) to which the application client 300 communicates with to provide a service. In this example, the application server is a VPN server supporting the authentication method used by the VPN client and the RADIUS challenge-response protocol. The authentication server 304 is a server that is able to authenticate the data provided by the authentication client. In this example, the authentication server 304 is a RADIUS server supporting challenge-response. RADIUS refers to the Remote Authentication Dial-In User Service, which is a client-server protocol that provides authentication, authorization and accounting services to end users or devices, thereby controlling access to certain network services. RADIUS challenge-response is a RADIUS-based authentication mechanism in which a user is given any number of challenges (via Access-Challenge RADIUS packets) from the RADIUS authentication server 304, which challenge packets are routed via the application server 302 to the application client 300 and to which the user has to respond. According to the protocol, the application client 300 then sends the user response (to the application server) to the RADIUS authentication server 304 (via Access-Request RADIUS packets) resulting in success (Access-Accept), failure (Access-Reject), or further challenge (Access-Challenge). The RADIUS challenge-response protocol is commonly used for 2-factor authentication involving a static password and a one-time password (OTC). RADIUS EAP (Extensible Authentication Protocol) refers a RADIUS-based authentication mechanism in which the application server forwards EAP RADIUS packets to and from the RADIUS authentication server without the need for the application server to support authentication-method specific code.

With the elements, and as illustrated in FIG. 3, an existing 2-factor authentication method begins at step (1) with the application client collecting authentication data (e.g., username and password) from the user. At step (2), the authentication client sends this data to the application server. At step (3), the application server makes a RADIUS Access-Request to the authentication server. At step (4), the authentication server returns to the application server the RADIUS Access-Challenge (or Access-Reject). The application server continues at step (5) by instructing the application client to issue prompt to the user with the challenge (or to provide notification of the failure). At step (6), the application client prompts the user with the challenge. At step (7), the application client collects more authentication data (e.g., a OTP) as a response to the challenge. The application client sends the response to the challenge to the application server at step (8) and, at step (9), the application server issues a RADIUS Access-Request to the authentication server that includes the challenge response. At step (10), the authentication server issues a RADIUS Access-Accept or Access-Reject, as the case may be (depending on whether the response was accepted). The application server provides the application client with a notification (success or failure) at step 11 to complete the process.

An alternative approach is 2FA over RADIUS EAP. In this scheme, the application client negotiates EAP with the application server, after which the application server sends an EAP request to the application client. The application client collects the required authentication data by interacting directly with the user (e.g., through a user interface) or to one or more devices (e.g., card readers, a biometric device, or the like). Often, this requires tightly-coupled integration between the application and third party authentication components (e.g., a biometric API) because there is no dominant standard for integrating with such components. The application client forwards the authentication data to the application server through an EAP response, which forwards the response to the RADIUS authentication server in an Access-Request packet. The RADIUS server validates the authentication data and responds with a challenge (Access-Challenge) or failure (Access-Reject) message. The application client responds to the challenge and the response is routed to the application server, which forwards it to the RADIUS server resulting in a success (Access-Accept) or failure (Access-Reject) message.

While the above approaches provide certain advantages, they also have significant deficiencies. Thus, for example, the 2FA over RADIUS challenge-response does not easily support other authentication methods because the challenge responses are limited to textual entries by the user (e.g., the OTP). The 2FA over RADIUS EAP also lacks the ability to support other authentication methods because the application client has to support every such authentication method with custom code often involving significant integration and support issues. For example, to support biometrics authentication, the authentication client has to integrate with various biometric vendors (their drivers and readers) and implement the UI/logic to prompt users to swipe a finger, collect a fingerprint, convert it to a template, or the like. Further, RADIUS EAP is not widely supported and, even where it is used, it is difficult for applications to mix and match authentication methods because the authentication method (s) are too tightly-coupled with the application.

Extending Authentication/Authorization Capabilities without Application Change

With the above as background, the techniques of this disclosure are now described.

In general, the approach described herein augments an existing client-server access application with an authentication mechanism that has a pair of cooperating components: an authentication agent (Auth Agent) that is associated with (and hooks into) the client-side of the client-server access application (e.g., at the login UI), and an authentication server (Auth Server) that is associated with the server-side of the client-server access application. Taking the example of a VPN, the authentication agent handles all of the client-side interaction with the user, device or host environment so that the user does not interact with the VPN client itself during authentication. On the server side, the authentication server includes all of the necessary logic to perform the desired authentication (authn) and/or authorization (authz) functionality. In operation, the authentication server issues commands to the authentication agent to acquire all required data from the user, device or host environment, and the authentication agent (which is hooked into the VPN client) scrapes requests originating from the authentication server and injects (e.g., by auto-fill) the appropriate responses into the VPN client UI for transmission back through the VPN server and to the authentication server, where they are acted upon. Preferably, the communications (between the authentication server and authentication agent) leverage an existing challenge-response protocol support (e.g., via RADIUS) that is present in the VPN client-server and that is already used to tunnel requests/responses between the various endpoints of the VPN itself.

Figure 4:
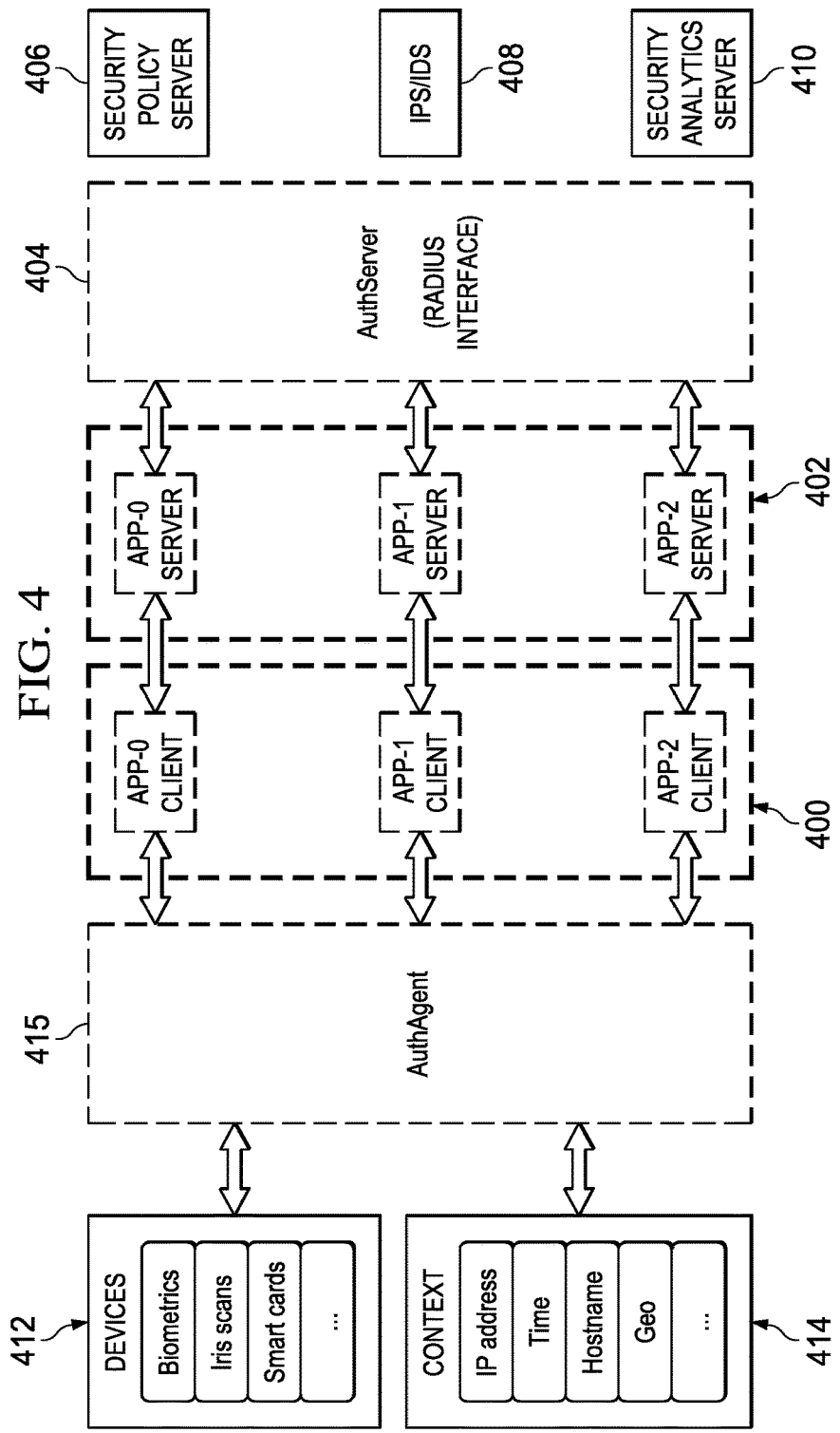
FIG. 4 illustrates an authentication solution comprising an authentication agent/server that implements the functionality of this disclosure.

With reference to FIG. 4, and as noted above, the technique assumes the existence of a client-server based access application that supports RADIUS challenge-response and whose authentication and/or authorization capabilities are desired to be extended, but without code changes to the application itself. The application server component of the existing application typically interfaces with the RADIUS-based authentication/authorization server. This is the conventional operating environment described above with respect to FIG. 3. Because the solution of this disclosure is designed to be a generic one (i.e. one that operates with different client-server applications), FIG. 4 illustrates a set of distinct application clients 400 and their associated set of application servers 402. In this context, application client 1 works with application server 1, application client 2 works with application server 2, and so forth. Thus, application 1 may be a VPN, application 2 a VDI, and so forth. Of course, these are merely examples and are not intended to be limiting. An application client may be a rich client, a thin client, a Windows OS-based client, a client written in Java, or any other application client that is capable of implementing or supporting RADIUS challenge-response. Each of the applications interface using RADIUS to the authentication/authorization server 404, once again in the manner previously described. Although FIG. 4 illustrates multiple client-server applications, this is not a limitation; rather, these examples simply illustrate that the techniques herein (as will be described below) provide a generic solution for arbitrary extension of the authentication/authorization capabilities of one or more access applications that use RADIUS challenge-response regardless of their particular operating characteristics. Thus, client-server access application should be broadly construed to include, without limitation, VPNs, VDIs, SBC solutions, web access gateways, wireless LAN gateways, cloud-access gateways, and the like. In this example scenario, a security policy server 406 may be used to manage and enforce a security policy at the server 404, and an intrusion prevention server 408 may be used to enable IDS/IPS services. The system may also include a security analytics server 410 for collecting and reporting on security events. On the client-side, the environment assumes the existence of one or more authentication mechanisms 412, such as biometric devices, scanners, smart card readers, and the like. The environment also assumes that client-based "context" (or "host") information 414, such as client machine IP address, time, hostname, geo-information, and the like, is available to the client-server access application. As described so far, the operating environment is a conventional one.

According to this disclosure, an authentication agent 415 is deployed and configured to interface with one or more of the authentication mechanisms 412, to receive the context information 414, and to interface with the one or more application clients 400 (which, as noted above, can be of different types). In particular, preferably the authentication agent 415 hooks into each application client in such a manner that it handles all the client-side interaction with the user, the authentication mechanisms 414, and the host operating environment. Preferably, this is accomplished by the authentication agent 415 hooking into the application client user interface (UI) such that the authentication agent reads from and writes to the application client UI automatically and without the user having to interact with that UI (or, more generally, with the application client).

The authentication agent 415 interacts with the authentication/authorization server 404, which incorporates all of the desired authentication and/or authorization logic. As will be described, the server sends commands to the authentication agent 415 to acquire all required data from the user, the authentication mechanism or the host environment. In a preferred embodiment, the authentication agent 415 uses UI-hooking techniques to scrape requests originating from the authentication/authorization server 404, and to inject by auto-fill the responses to such requests into the application client UI for transmission back to the server 404. Advantageously, these requests and their responses are communicated (between the server 404 and agent 415) by leveraging the existing support (used by the client-server application itself) for RADIUS challenge-response.

In FIG. 4, the authentication/authorization logic resides in the standard RADIUS server, although this is not a limitation.

Figure 5:
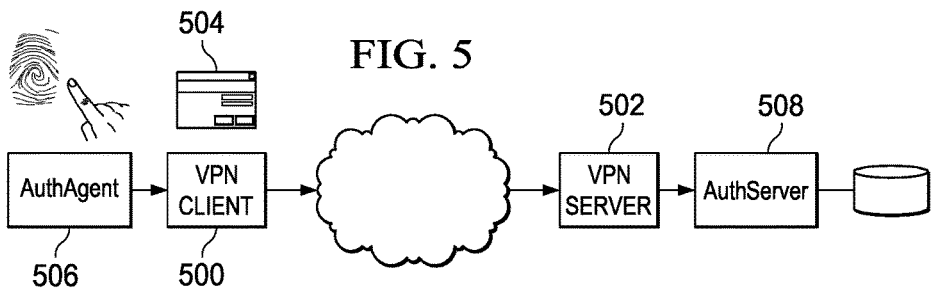
FIG. 5 illustrates how a VPN application can be augmented with the authentication agent/server to provide enhanced authentication/authorization capabilities according to this disclosure.
Figure 6:
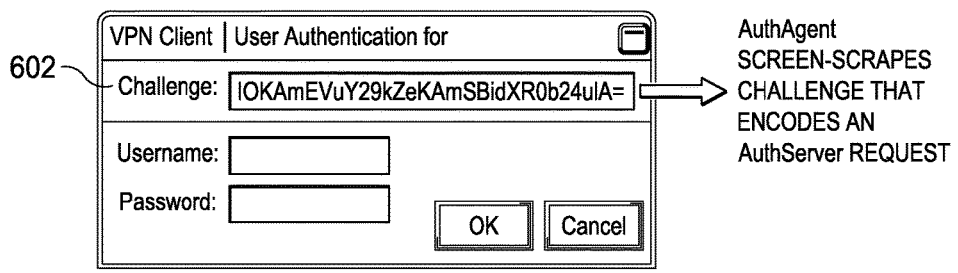
FIG. 6 illustrates the VPN client UI logon displaying a challenge received from the authentication server and to be scraped by the authentication agent.
Figure 7:
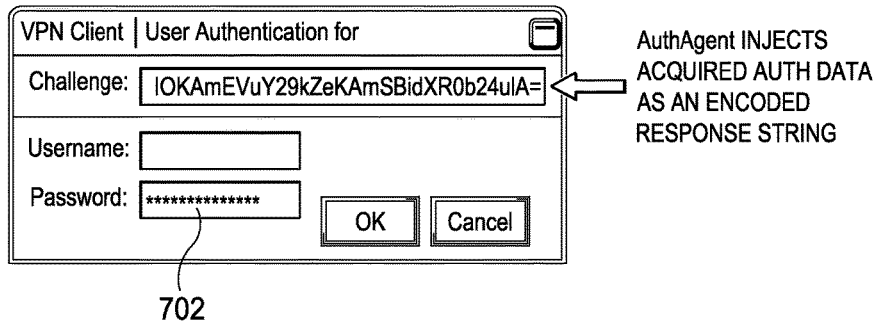
FIG. 7 illustrates the VPN client UI logon of FIG. 6 displaying the response generated by and auto-filled by the authentication agent.

Referring now to FIG. 5, the basic operation of the disclosed technique for a VPN access application is illustrated. In this example, the VPN comprises a VPN client 500, and a VPN server 502. The VPN client displays a logon UI 504 in a conventional manner. The VPN client 500 and VPN server 502 support RADIUS challenge-response. To extend the authentication/authorization capabilities of the VPN, the authentication agent 506 is associated with the VPN client. This association may be achieved by hooking the agent to scrape information from the VPN logon UI 504, and to auto-fill one or more data fields in that logon UI. The authentication server 508 supports the desired authentication and/or authorization logic that is desired to be added to the application. In operation, the authentication server 508 issues a request to the authentication agent 506 to collect data. This request is encoded as a RADIUS challenge, which is then displayed on the VPN logon UI in the manner shown in FIG. 6. Because the authentication agent is hooked into the logon UI, it screen scrapes the challenge 602 (that encodes the authentication server request), decodes the challenge to obtain the request, and then acts upon that request. Typically, the request will instruct the authentication agent to acquire data to facilitate an authentication and/or authorization operation (that will be carried out at the authentication server 508). To this end, the authentication agent 506 reads data from the host machine or attached devices, or it may prompt the user for the data. Regardless of how the requested data is obtained, the authentication agent encodes that data, and injects it (the encoded data) back into the logon UI as the response to the challenge. FIG. 7 illustrates the authentication agent injecting the acquired authentication and/or authorization data as an encoded response string 702 into the password field of the logon UI. This auto-fill operation occurs automatically and without user input (to the logon UI). The VPN client 500 then receives the response and returns it to the VPN server 502 as the response to the challenge. The VPN server 502 then passes the response on to the authentication server, where it can be acted upon. If the authentication server then determines that more authentication/authorization data needs to be gathered, the challenge-response process is repeated as many times as needed.

In this approach, the user sees the VPN client logon UI opening and closing by itself, but the user does not interact with it; these interactions (i.e. scraping for the challenge and auto-inserting the response) are carried out by the authentication agent directly and without user interaction. The only user interaction may be to respond to a prompt that is initiated by the authentication agent (e.g., to insert a finger into a biometric reader, to insert a smart card into an attached reader, to enter a PIN into a keyboard, or the like), but such prompts do not cause the user to interact with the VPN client itself. Thus, when referring to interactions that take place "without user input" or "interaction," this is a reference to the fact that the technique of this disclosure does not require the user to interact with the application client, because these interactions are carried out by the authentication agent automatically.

Thus, according to this disclosure, the authentication agent (sometimes referred to as "Auth Agent") performs the necessary authentication/authorization data gathering and user/device interfacing, and then tunnels the authn/authz data through the application client's UI, through the application server, and out to the RADIUS interface of a corresponding authentication server (sometimes referred to as "Auth Server"). This is done seamlessly and reliably by leveraging the existing RADIUS challenge-response mechanism used by the application client and the application server. As noted above, VPNs and similar access applications typically are configured to rely on an external RADIUS server for authn/authz decisions. The RADIUS server not only can provide allow/deny decisions back to the application server, but it can also return additional attributes that the application server can use for making authorization decisions (e.g., whether to grant a user access to different parts of the network). By supporting the RADIUS protocol/interface, the authentication server thus can easily integrate with all of these applications. As further noted, VPNs and similar applications typically support the challenge-response feature of the RADIUS protocol whereby the application client displays arbitrary challenge strings carried in "Access-Challenge" packets coming (through the application server) from the RADIUS server, prompts the user for a response string, and passes on the response string within an "Access-Request" packet back (through the application server) to the RADIUS server. Traditionally, the challenge string is intended for the user to read, and the response string is usually manually typed in by the user. In the approach of this disclosure, and as illustrated in FIGS. 6-7, this functionality is leveraged to enable the authentication agent and the authentication server to communicate arbitrary messages with each other but without user input.

Preferably, and as noted above, the authentication agent implement any form of authentication and related communications technologies (e.g., biometrics, card readers, Bluetooth, RFID, NFC, and the like), and it can harvest any form of information (e.g., active IP addresses, MAC address, geo-location, OS version/patch level, anti-virus software/last-update time, and the like). In addition, the authentication agent has the capability to prompt a user for any needed information (e.g., employee ID, phone number, personal secrets, or the like). The authentication server can request from the authentication agent any authn/authz data (about the user and machine) it needs, possibly in an incremental manner based on a configurable authn/authz policy. In addition, the authentication server may make its authn/authz decision based not just on client-side collected data, but also based on dynamic server-side data about the user (e.g., historical access patterns) and the system (e.g., recent failure events). This flexibility enables "risk-based" authentication. As also illustrated in FIG. 4, the authentication server may be integrated with other server-side security products such as security policy managers, which manage access policies, security information and event managers to collect security analytics, and intrusion protection systems where threat information can be consulted. In this manner, a more unified security and threat management across applications, resources, networks and endpoints in an enterprise can be realized.

As has been described, by using the authentication agent and leveraging the existing RADIUS challenge-response capability of the client-server application, the described approach does not require any change to either the client application or the server application. Thus, the technique enables arbitrary extension of the authentication and/or authorization capabilities of the application, all without code changes. The technique may be implemented for any application whose client/server components support the base RADIUS protocol (RFC 2865) including the "Access-Challenge" feature. The application client may be of any type provided it can display the challenge string in an Access-Challenge packet and be able to package the response string into a return "Access-Request" packet to be sent to the server side.

Preferably, the authentication agent has the capability to be configured with one or more profiles of various applications for which it needs to provide authentication. Each profile instructs the authentication agent how to identify the application being accessed, how to retrieve the challenge message displayed on the application client, as well as how to inject the response message. This type of functionality may be implemented using existing profiling technologies (e.g., SSO profiles available in various enterprise SSO (E-SSO) products). The profile may also define the size of the challenge and password fields, as well as other information to enable the agent to retrieve and decode the challenge, and to encode and inject the response to the challenge. At a minimum, the profile identifies which UI screens and screen elements the authentication agent needs to watch out for; thus, typically the profile specifies the application's process name (e.g., "cisco-vpn.exe"), the logon UI screen signature (e.g., windows title="Cisco VPN"), as well as the signatures of the RADIUS-related fields and controls, e.g., username, password, challenge, response, submit (for Windows apps, these are usually identified using a "control ID" of these UI controls). Such functionality also is available in existing E-SSO products and technologies. When the user launches an application client, the authentication agent reads the profile and starts monitoring the application client's UI. Depending on the profile for the application, the authentication agent may start acquiring data about the user/machine proactively, or it can wait for a challenge to be issued by the authentication server and then react accordingly.

Figure 8:
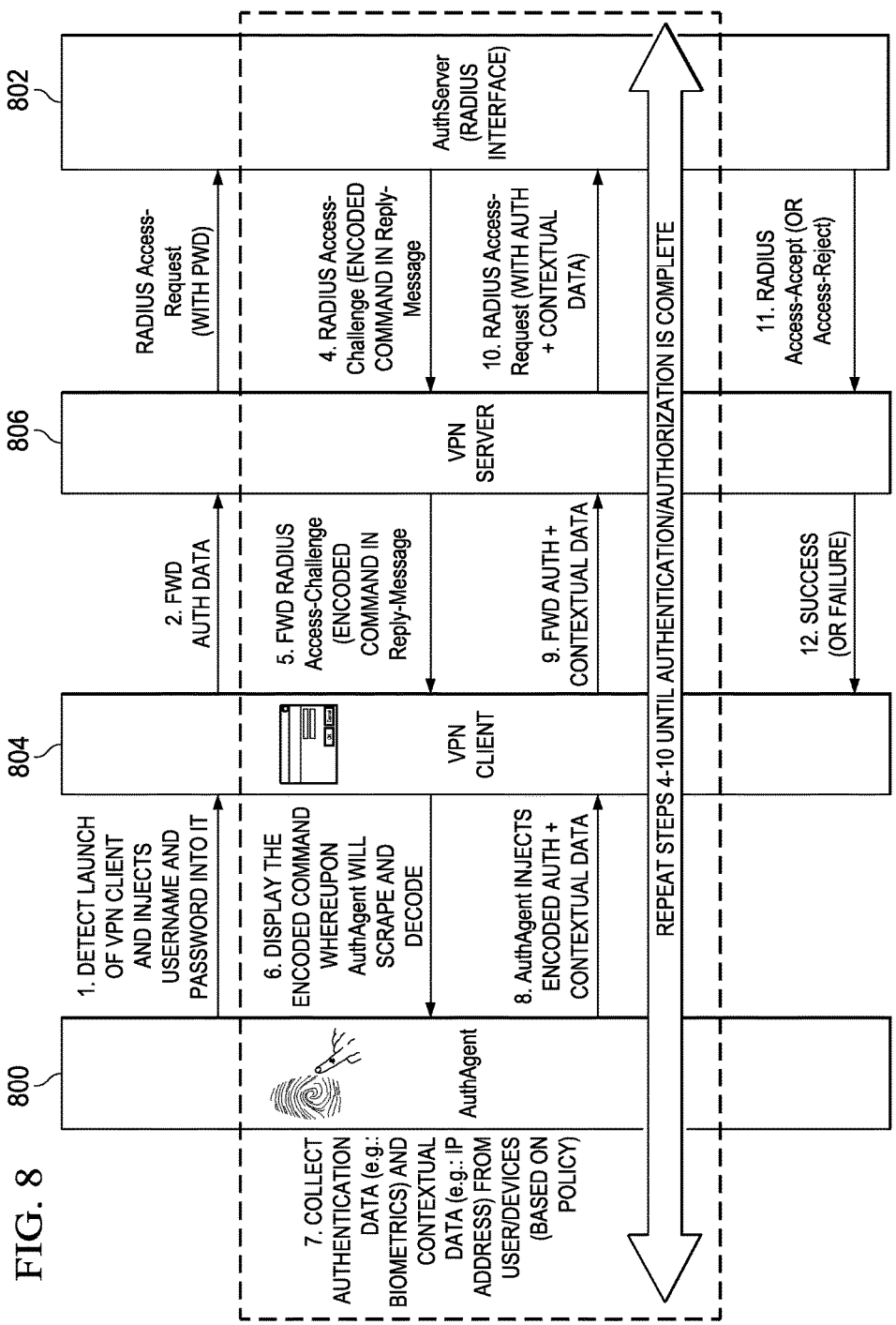
FIG. 8 illustrates a representative two (2) factor authentication (2FA) scheme using the VPN and the technique described herein.

FIG. 8 illustrates in more detail how the RADIUS challenge-response is leveraged to facilitate the communications between the authentication agent 800 and the authentication/authorization logic in the authentication server 802. VPN client 804 and VPN server 806 operate conventionally. At step (1), the authentication agent detects the launch of the VPN client and, based on the profile (in this example scenario), injects username and password into the VPN client logon UI. At step (2), the VPN client forwards the authentication data to the VPN server. At step (3), the VPN server issues a RADIUS Access-Request (with the password) to the authentication server. The server 802 responds at step (4) with a RADIUS Access-Challenge that includes an encoded command in the RADIUS Reply-Message. At step (5), the VPN server forwards a RADIUS Access-Challenge that includes the encoded command in the Reply Message. At step (6), the encoded command is displayed as a challenge in the logon UI; the authentication agent scrapes the challenge and decodes it to obtain the request command actually issued by the authentication server. At step (7), the authentication agent acts on the request, typically by collecting (from the user, from a device, or from the host environment) one or more of: actual user authentication data (e.g., biometrics) and contextual data (e.g., IP address, etc.). As noted above, based on the profile for the application, some of this information may be collected in advance of receiving the actual request command but, typically, at least some of it is collected in response to receipt of the request command. The actual data collected may depend on the profile, on a security policy, or the like. At step (8), the authentication agent encodes the received/collected authentication and contextual data into a string that it then automatically injects into the VPN client logon UI. The VPN client forwards the string back to the VPN server at step (9). At step (10), the VPN server sends a RADIUS Access-Request to the authentication server, passing the authentication and contextual data. At step (11), and having acted upon the received data, provides a RADIUS Access-Accept or Access-Reject. The VPN server returns to the VPN client a success or failure message at step (12) to complete the process. Steps (4)-(10) are then repeated as necessary until authentication/authorization is complete. As noted above, typically steps (6)-(8) take place very quickly such that the user only sees the application client UI flash onto the screen; the user, however, cannot interact with the UI during these operations.

Implementation Scenarios

The nature of the one or more command requests that are issued by the authentication server and acted upon by the authentication agent may be quite varied and is not a limitation of the technique. Thus, for example, the authentication server may request a different authentication factor (e.g., an OTP) depending on the role of the user logging on. Alternatively, the authentication server can first request (in a challenge) for additional attributes about the machine (e.g., what readers are attached, what the machine IP address or geo-location is, etc.) before issuing a second challenge requesting for authentication of a certain type.

The following are additional example scenarios.

A first example illustrates support for "Serial ID" cards/tokens as a second factor. In operation, after verifying user's first factor (typically a "password"), the Auth Server issues a challenge requiring user to present his RFID badge as a second factor. The Auth Agent interprets the challenge and prompts user to swipe his or her RFID badge (e.g. a Mifare card) on an attached RFID reader, reads the CSN (card serial number) off the card, and then submits the CSN as the response through the App Client and Server. The response is passed on through to the Auth Server where it is authenticated against a database containing the user's CSN hashes.

A second example describes how the technique can be used to support cryptographic-based authentication methods. In operation, the Auth Server issues a challenge string of randomly-generated bytes. The Auth Agent retrieves this challenge string from the App Client and prompts user to insert card/token (containing some encryption key) into an attached reader. Depending on the type of card/token, the Auth Agent uses the appropriate encryption key (a symmetric key or a private key) to encrypt the challenge string and then auto-fills the ciphertext into the App Client's response field. This response is then passed back to the Auth Server where it can be verified against a corresponding encryption key stored for the user/token. Unlike traditional smartcard cert-based authentication that some Apps natively support, this method also works for non-PKI smart cards like Mifare cards.

As a third example, the technique may be used to support incremental, risk-based, and multi-factor authentication/authorization schemes. In one scenario, assume that the Auth Server supports risk-based authn/authz using rules that analyzes the request against user's historical access patterns stored in a database. In this case, the Auth Server might issue a challenge requesting that the Auth Agent return back the geo-location, MAC address and IP address of the client machine. If these attributes deviates from the norm for this user, the Auth Server can issue additional challenges requesting the Auth Agent to perform additional authentication or checks. Depending on the situation, user may need to authenticate with one, two or more than two authentication factors. Such an approach maximizes both security and convenience.

As another example, the techniques may be used to support authentication mechanisms involving transfer of large payloads. As an example, assume the Auth Agent can interface with biometric middleware/devices, and that the Auth Server can verify an incoming fingerprint template against a database of reference templates. In operation, the Auth Agent can first prompt user to present his or her finger, read off the biometric template from biometric middleware, and then transfer the template over a sequence of challenge-response messages thru the App Client and Server. For example, assuming that the App client can only support challenge and response strings of up to 256 bytes, it a sequence of 4 challenge-response round-trips may then be required to transfer a 1 KB biometric template to the Auth Server for verification.

More generally, the technique enables support of arbitrary authentication mechanisms that may be developed in the future. For example, assume a new authentication mechanism involves the display of personalized picture images or short audio/video segments to the user. Using the described above, this method is made available to RADIUS-compatible apps by tunneling the image/audio/video in multiple "challenge" strings from the Auth Server to the Auth Client. In another example, assume that the new mechanism requires uploading of images/audios/videos (e.g. captured by a web-cam) to the Auth Server for image/audio/video analysis; a similar approach can be taken to address this authentication requirement.

Of course, the above scenarios are merely illustrative and should not be taken to limit the subject matter of this disclosure.

The authentication agent and the authentication server need to share a common handshaking protocol for verifying each other's authenticity, exchanging version numbers (for version compability), exchanging session encryption keys, exchanging agent-server capability information, as well as for tunneling commands and data (separate and apart from the RADIUS challenge/response) from one end to the other as needed. In addition, and for security reasons, preferably the authentication agent and server exchange data in encrypted/scrambled form such that the challenge strings displayed and the response strings accepted are not human-legible or otherwise capable of being tampered-with. Thus, the user cannot impersonate the authentication agent, and any attempt to do so generates an access rejection. Session keys may be exchanged between the agent and server during any handshake process.

When multiple challenge-response roundtrips are required to complete the authentication process, the authentication agent may display other information in a separate dialog that overlays the application client UI that would otherwise be flashing.

In an alternative embodiment, longer challenges and responses may be supported in hidden or invisible fields that are accessible by the authentication agent but not to the human eye. As another alternative, and (for example) if a common API for authentication agents to retrieve and submit challenge/response strings from an application client is defined, then the authentication agent can interface with the application client programmatically and without necessarily having to interact directly with the logon UI. This alternative may provide a faster and smoother overall user experience in certain scenarios (e.g., where the application provider is concerned about user confusion with the logon UI flash).

Thus, according to the described technique, UI monitoring/automation technologies are advantageously used to tunnel authn/authz commands and data between the authentication agent and its counterpart server through any RADIUS-compliant application. The approach enables support of any arbitrary authentication technologies and mechanisms with a variety of RADIUS-compliant applications without any code change to the applications, while still accommodating to the different RADIUS-support characteristics of the various application clients. The approach may be used to retrieve and enable delivery to the authentication server of all forms of client machine data, including context information that is useful to facilitate risk-based authentication. The approach facilitates cryptographic-based authentication, as well as the marshaling and transfer of large payloads through a variety of RADIUS-based applications. The approach facilitates incremental request and delivery of authentication data, which provides additional flexibility for many use cases. The approach supports implementation of complex authn/authz decisions to be made at the authentication server, using rules and policies that feed off arbitrary authentication and contextual data available either at the client or server side of the application.

The technique provides many other advantages. As noted above, a key advantage is that it is applicable to any client-server access application that supports the base RADIUS protocol, and it does not required any code changes to enable the application to support any existing or new authentication/authorization mechanism. The approach enables the same authentication product (comprising the Auth Agent and Auth Server) and authn/authz mechanism to be used across all applications in an enterprise. It enables the organization to quickly swap in/out of the environment a new authentication mechanism or product without any change to any application merely by replacing or supplementing the Auth Agent/Auth Server. The applications automatically and seamlessly interoperate with the new authentication product. The technique has the further advantage of enabling risk-based and contextual-based authn/authz scenarios and to provide new and enriched authn/authz capabilities through integration with other security products such as log manager, intrusion protection systems, and security analytics products. As a further advantage, the approach enables enterprises to accelerate their move towards cloud-based architectures (even if they require stronger and yet interoperable forms of authentication), e.g., by enabling cloud providers to delegate cloud authentication functions to the respective authentication agents/servers deployed within the client's organization (thereby freeing up the provider to focus on its core application features). The approach is not dependent on any new standards being defined, yet it is also amenable to and may take advantage of future standardization efforts (e.g. of the Auth Agent/Server protocol, of an API between the Auth Agent and the application client, and so forth).

As noted, the functionality described above may be implemented as a standalone approach, e.g., a software-based function executed by a processor, or it may be available as a managed service (including as a web service via a REST or SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, Liberty, Shibboleth, OpenID, WS-Federation, Cardspace, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

As the above examples illustrate, one or more of the described functions may be hosted within or external to the cloud.

Still more generally, the subject matter described herein can take the form of an entirely hardware embodiment, an entirely software embodiment or an embodiment containing both hardware and software elements. In a preferred embodiment, the workflow recording and playback functions are implemented in software, which includes but is not limited to firmware, resident software, microcode, and the like. The data can be configured into a data structure (e.g., an array, a linked list, etc.) and stored in a data store, such as computer memory. Furthermore, as noted above, the recording and playback functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the authentication agent and server components are implemented in a special purpose computer, preferably in software executed by one or more processors. The software also is maintained in one or more data stores or memories associated with the one or more processors, and the software may be implemented as one or more computer programs.

The authentication agent function referenced herein may be implemented as an adjunct or extension to an existing authentication system or module. More generally, the described functionality may comprise a component of an authentication product solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

Challenge-response protocols other than RADIUS challenge-response may be used.

Having described our invention, what we now claim is as follows.

The invention claimed is:

1. A method of extending an authentication or authorization capability of an application comprising a client component and a server component, the client component and the server component supporting a challenge-response protocol, comprising:
   associating an authentication agent with the client component by hooking into an interface of the client component, the authentication agent having a counterpart authentication server;
   in response to receipt at the interface of a challenge that encodes a command issued to the authentication agent by the authentication server, generating a response to the challenge that encodes authentication data that has been collected by the authentication agent, wherein the challenge is retrieved from, and the response is entered into, the interface of the client component by the authentication agent automatically and without requiring user input to thereby extend the authentication or authorization capability of the application;
   delivering the response through the server component and to the authentication server for an authentication or authorization action.

2. The method as described in claim 1 wherein the interface of the client component is a logon user interface (UI).

3. The method as described in claim 1 wherein the step of generating a response to the challenge comprises:
   decoding the challenge to obtain the command;
   collecting the authentication data; and
   encoding into the response the collected authentication data.

4. The method as described in claim 3 further including collecting contextual data along with the authentication data, wherein the response encodes the collected authentication data and the collected contextual data.

5. The method as described in claim 1 further including:
   providing a second challenge; and
   obtaining a corresponding second response to the second challenge, the second response being delivered through the server component and to the authentication server to facilitate the authentication or authorization action.

6. The method as described in claim 1 further including generating a profile that identifies one or more elements of the client component interface that are to be monitored by the authentication agent to identify the challenge and to receive the response.

7. The method as described in claim 1 wherein the challenge-response protocol is RADIUS.

8. Apparatus, comprising:
   a processor;
   computer memory holding computer program instructions that when executed by the processor extend an authentication or authorization capability of an application comprising a client component and a server component, the client component and the server component supporting a challenge-response protocol, the computer program instructions comprising:
      code to hook an authentication agent into an interface of the client component, the authentication agent having a counterpart authentication server;
      code responsive to receipt at the interface of a challenge that encodes a command issued to the authentication agent by the authentication server to generate a response to the challenge that encodes authentication data that has been collected, wherein the challenge is retrieved from, and the response is entered into, the interface of the client component by the authentication agent automatically and without requiring user input to thereby extend the authentication or authorization capability of the application; and
      wherein the response is adapted to be delivered by the client component through the server component and to the authentication server for an authentication or authorization action.

9. The apparatus as described in claim 8 wherein the interface of the client component is a logon user interface (UI) and the code hooks into the logon UI.

10. The apparatus as described in claim 8 wherein the code to generate the response to the challenge comprises:
    code to decode the challenge to obtain the command;
    code to collect the authentication data; and
    code to encode into the response the collected authentication data.

11. The apparatus as described in claim 10 wherein the code to generate the response further includes:
    code to collect contextual data along with the authentication data, wherein the response encodes the collected authentication data and the collected contextual data.

12. The apparatus as described in claim 8 wherein the code screen scrapes the logon UI to obtain the challenge.

13. The apparatus as described in claim 8 wherein the code auto-fills the response into the logon UI.

14. The apparatus as described in claim 8 further including code to generate a profile that identifies one or more elements of the client component interface that are to be monitored to identify the challenge and to receive the response.

15. A computer program product in a non-transitory computer readable medium for use in a data processing system, the computer program product holding computer program instructions which, when executed by the data processing system, extend an authentication or authorization capability of an application comprising a client component and a server component, the client component and the server component supporting a challenge-response protocol, the computer program instructions comprising:

code to hook an authentication agent into an interface of the client component, the authentication agent having a counterpart authentication server; and code responsive to receipt at the interface of a challenge that encodes a command issued to the authentication agent by the authentication server to generate a response to the challenge that encodes authentication data that has been collected, wherein the challenge is retrieved from, and the response is entered into, the interface of the client component by the authentication agent automatically and without requiring user input to thereby extend the authentication or authorization capability of the application;

wherein the response is adapted to be delivered by the client component through the server component and to the authentication server for an authentication or authorization action.

16. The computer program product as described in claim 15 wherein the interface of the client component is a logon user interface (UI) and the code hooks into the logon UI.

17. The computer program product as described in claim 15 wherein the code to generate the response to the challenge comprises:

code to decode the challenge to obtain the command;

code to collect the authentication data; and code to encode into the response the collected authentication data.

18. The computer program product as described in claim 17 wherein the code to generate the response further includes:

code to collect contextual data along with the authentication data, wherein the response encodes the collected authentication data and the collected contextual data.

19. The computer program product as described in claim 15 wherein the code screen scrapes the logon UI to obtain the challenge.

20. The computer program product as described in claim 15 wherein the code auto-fills the response into the logon UI.

21. The computer program product as described in claim 15 further including code to generate a profile that identifies one or more elements of the client component interface that are to be monitored to identify the challenge and to receive the response.

22. An authentication system to extend an authentication or authorization capability of an application comprising a client component and a server component, the client component and the server component supporting a challenge-response protocol, comprising:

an authentication server that implements authentication/authorization logic; and an authentication agent adapted to be executed by a hardware element, the authentication agent including first code to hook into an interface of the client component, and second code that is responsive to receipt at the interface of a challenge that encodes a command issued to the authentication agent by the authentication server to generate a response to the challenge that encodes authentication data that has been collected by the authentication agent, wherein the challenge is retrieved from, and the response is entered into, the interface of the client component by the authentication agent automatically and without requiring user input to thereby extend the authentication or authorization capability of the application;

wherein the response is adapted to be delivered by the client component through the server component and to the authentication server for an authentication or authorization decision using the authentication/authorization logic.

23. The authentication system as described in claim 22 wherein the challenge-response protocol is RADIUS.

24. The authentication system as described in claim 22 wherein the authentication server returns the authentication/authorization decision to the client component.

* * * * *